3,474,157
POLYMERIZED ETHYLENE POUR POINT DEPRESSANTS FROM ALKANOL MODIFIED CATALYSTS
Herschel T. White, Montclair, and Arthur W. Langer, Jr., Watchung, N.J., assignors to Esso Research and Engineering Company, a corporation of Delaware
No Drawing. Original application Sept. 14, 1960, Ser. No. 55,845, now Patent No. 3,168,588, dated Feb. 2, 1965. Divided and this application Nov. 23, 1964, Ser. No. 413,347
The portion of the term of the patent subsequent to Feb. 2, 1982, has been disclaimed
Int. Cl. C07c 3/18
U.S. Cl. 260—683.15  6 Claims This invention relates to an improved method of preparing hydrocarbon oils. More particularly, it relates to polymerizing ethylene-containing gases to obtain oils and oil-soluble semi-solids having an average molecular weight of about 80–2,000. This application is a division of S.N. 55,845, filed September 14, 1960, now Patent No. 3,168,588.

It has been developed that hydrocarbon oils having a minimum viscosity index of 140 and a molecular weight in the range of 350 to 800 could be prepared by polymerizing ethylene with controlled catalysts, diluents and under controlled temperatures. The catalyst consisted of a transition metal halide and a halogenated alumina alkyl compound.

It has now been found that increased oil yields and catalyst reactivity are obtained in the products desired by the utilization of a minor amount of a lower alkanol as a catalyst modifier. Additionally, improved molecular weight control is obtained.

It is surprising that the alkanols improve the process in that the presence of these materials is normally considered inconsistent with satisfactory catalyst performance in the systems used. In fact, the usual technique for inactivating catalyst at the end of a run is addition of excess alkanol (on catalyst).

The lower alkanols utilized are those in the $C_1$ to $C_8$ range, preferably $C_1$ to $C_4$. The improvement from the use of the alkanol increases with molecular weight within the stated range. It has also been found that the structure of the alkanol is important. For the butanol series (see table in Example 3), the yield increased markedly upon changing from primary to secondary to tertiary alcohol. Also, the selectivity to polymer oil (lower average molecular weight) was considerably higher for secondary butanol and tertiary butanol than for isobutanol. Thus, the alkanols that can be used include methanol, ethanol, n-propanol, isopropanol, n-butanol, sec-butanol, tertiary butanol, isobutanol and all of the $C_5$ and $C_6$ alcohols. $C_3$ to $C_6$ diols in which the hydroxy groups are not attached to adjacent carbon atoms are also useful. Especially preferred and desirable are: tertiary butanol, secondary butanol, iso- or n-butanol, and isopropanol. These alkanols are utilized in a minor amount, i.e., so that the ratio of ROH/R (based on aluminum alkyl) after reduction of the transition metal is not greater than 0.5 (preferably 0.2 to 0.33).

The unmodified catalysts are solid, insoluble, reaction products obtained by partially reducing a reducible, heavy, transition metal halide of a Group IV B to VI B or VIII metal with a halogenated aluminum alkyl compound having the formula: $AlR_nX_{3-n}$, $n$ representing a number of at least 1 but less than 2. Preferred transition metal halides include chloride materials such as $TiCl_4$, $ZrCl_4$, $VCl_4$, etc. It is also possible to start with a reduced, heavy transition metal halide such as $TiCl_3$.

The formula of halogenated aluminum alkyl compound has been presented above. The $n$ can represent average values since a mixture of aluminum diethyl chloride and aluminum ethyl dichloride is preferred in many instances. It is essential that these halogenated derivates be employed as contrasted to the hydrocarbon aluminum derivatives such as aluminum triethyl, aluminum triisobutyl, etc. The amount of solid polymer increases as the value of $n$ goes from 1 to 2. An especially effective compound for use is aluminum ethyl dichloride. The molar ratio of aluminum compound to transition metal halide compound can be in the range of 0.1 to 20, preferably 2 to 5. The initial concentrations of catalyst components are normally in the range of 0.0005–0.1 mole per liter of diluent.

The use of these halogenated aluminum derivatives appears to be important for another reason. These compounds apparently control the amount of branching introduced into the polymer product so as to obtain those having branching configurations consistent with the required viscosity indices. Thus nonhalogenated aluminum derivatives result in the production of linear solid materials. Conversely, excessive Lewis acidity results in excessive branching and isomerization so that the desired products are not obtained.

The alkanol can be added either to the transition metal halide or the aluminum alkyl halide prior to the addition of the other component. It is preferred to add it, however, to the aluminum alkyl halide.

Ethylene is unique in the instant invention in that other olefins do not respond to give similar products. Although higher alpha olefins do not homopolymerize with the catalysts and conditions of this invention, the lower olefins can be copolymerized with ethylene to a limited extent. For example, at high ratios of comonomer to ethylene, a maximum of about 25% propylene can be incorporated into the copolymer. Butene-1 and higher alpha olefins copolymerized to a much lesser extent as the size of the olefin increases. Because of the high selectivity of this catalyst system for ethylene polymerization, a wide variety of ethylene-containing gases may be used as feeds. Thus, feed mixtures containing a major proportion of a higher alpha olefin are operable in many cases, although catalyst activity and efficiency are highest when ethylene is the major component. Most important in this regard is the fact that the viscosity index of the products is adversely affected by excess branching so that the amount of higher olefin which enters the product should be controlled by limiting its concentration in the feed and/or adjusting the catalyst composition and polymerization conditions.

The process temperatures employed are below 70° C. and preferably a temperature of −10 to +50° C. is utilized. The reaction is carried out by first mixing in the proper proportions solutions of the catalyst components in the halogenated aromatic diluent, preferably $C_6H_5Cl$ or $C_6H_4Cl_2$, at temperatures <25° C. and in the absence of moisture, oxygen, and sulfur impurities. The resulting alkanol modified, Ti halide/Al alkyl halide/diluent coordination complex is believed to constitute the active polymerization catalyst. The reaction pressure utilized is generally in the range of 0 to 50 p.s.i.g. The selectivity to liquid product drops off sharply above the maximum temperature which depends upon the catalyst acidity, diluent polarity and the alcohol type. If o-dichlorobenzene (commercial grade) is substituted for monochlorobenzene, however, selectivity to oil ≥90% can be obtained in a t-butanol modified system at temperatures as high as 60°–70° C. Lower maximum polymerization temperatures must be used with less polar diluents and less branched alcohols.

The polymerization must be carried out in the presence of a halogenated aromatic hydrocarbon diluent preferably a dichlorobenzene or monochlorobenzene. The use of aliphatic chlorinated solvents results in rapid catalyst deactivation, much lower efficiencies and excessive branching. The halogenated aromatic hydrocarbons can be used alone or in conjunction with other diluents such as heptane, benzene, xylene, etc., provided that the halogenated aromatic material comprises a minimum of 40 vol. percent of the total diluent mixture and the halogen replaces at least one of the hydrogens of the aromatic ring.

The oils of this invention have a minimum boiling point of about 62° C. The lube oil fraction has a minimum viscosity index of 140 and a molecular weight in the range of 350 to 800. The lower boiling olefin products are valuable chemical raw materials, and the higher boiling, oil-soluble, semi-solids are active middle distillate pour point depressants.

This invention and its advantages will be better understood by reference to the following examples.

EXAMPLE 1

0.006 mole of $TiCl_4$ and 0.012 mole of methanol in 300 ml. of monochlorobenzene were saturated with $C_2H_4$ between 0 and (−)5° C. There was little or no reaction between the $TiCl_4$ and alcohol at this temperature for the 20 minute period that alkyl aluminum halide was absent from the system. 0.024 mole of $Et_{1.5}AlCl_{1.5}$ in 400 ml. of chlorobenzene was introduced at (−)5° C. The reactor temperature was increased to 15° C. and ethylene polymerization was continued for 2 hours. Out of 125 gms. of total product, 38 gms., 30 wt. percent of 405° C.+ distillation bottoms were obtained. This material blended 0.1 wt. percent in heating oil reduced the pour point from −17° to −35° C.

This example demonstrates improved selectivity over unmodified catalysts to soluble wax which is an effective pour depressant.

EXAMPLE 2

A test was run on the polymerization of ethylene in the presence and absence of minor amounts of isopropanol. The catalyst comprised 0.006 mole $TiCl_4$, 0.006 mole $Et_2AlCl$, and 0.024 mole $EtAlCl_2$ in 1000 ml. monochlorobenzene diluent. Titanium was reduced for 1 hour at 25° C. with 0.006 mole $Et_2AlCl$ and 0.012 mole $EtAlCl_2$ before addition of remaining components. Ethylene polymerization period was 2 hours at 25° C. The results are tabulated below.

| Modifier, moles | [1] 0.006 | None |
|---|---|---|
| Yield, ml | 330 | 300 |
| Solid polymer: | | |
| M.W.×10⁻³ | 14.0 | 18. |
| Vol. percent | 9 | 16 |
| $C_{24-150}$ oil and soluble wax, vol. percent | 46 | 50 |
| $C_{4-24}$ olefins, vol. percent | 45 | 34 |

[1] Isopropanol.

This example demonstrates the increased activity and reduced mol. weight of the products obtained by the modified catalyst of this invention.

EXAMPLE 3

Tests were run on the polymerization of ethylene with various hydroxy-containing materials. The catalyst comprised 0.006 mole $TiCl_4$, 0.006 mole $Et_2AlCl$, 0.012 mole $EtAlCl_2$, and 0.006 mole of modifier in 1,000 ml. mono-chlorobenzene diluent. $TiCl_4$ was reduced for 1 hour at 25° C. with the mixed alkyl aluminum halide before the modifier was added. Ethylene was polymerized for 2 hours at 25° C. The results are tabulated below.

| Modifier | [1] | [2] | [3] | [4] |
|---|---|---|---|---|
| Yield, ml | 470 | 270 | 270 | 170 |
| Solid Polymer: | | | | |
| M.W.×10⁻³ | 9.7 | 10.7 | 15.2 | 17.8 |
| Vol. percent | 14 | 13 | 35 | 74 |
| $C_{24-150}$ oil and soluble wax, vol. percent | 45 | 42 | 49 | ca. 25 |
| $C_{4-24}$ olefins, vol. percent | 41 | 45 | 16 | ca. 1 |

[1] t-Butanol.
[2] Sec. butanol.
[3] Isobutanol.
[4] Isopropanol.

These results demonstrate that the alkanols increase in effectiveness with molecular weight, branching and structure, i.e., from primary to tertiary.

EXAMPLE 4

The effect of aluminum-titanium ratio and temperature was determined. The catalyst was $TiCl_4$, 0.006 mole; $Et_2AlCl$, 0.006 mole; $EtAlCl_2$, 0.012 mole; isopropanol, 0.006 mole with 1000 ml. monochlorobenzene diluent. $TiCl_4$ was reduced for 1 hour at 25° C. with the mixed alkyl aluminum halides before the alcohol was added. In runs 2 and 3 an extra 0.012 mole of $EtAlCl_2$ was added at this point. Ethylene was polymerized for 2 hours. The results are tabulated below:

| | Runs | | |
|---|---|---|---|
| | 1 | 2 | 3 |
| Run Temp., ° C | 25 | 25 | 10 |
| Al/Ti ratio | 3 | 5 | 5 |
| Yield, ml | 170 | 330 | 230 |
| Solid polymer: | | | |
| M.W.×10⁻³ | 17.8 | 14.0 | 23.0 |
| Vol. percent | 74 | 9 | 5 |
| $C_{10-150}$ oil and soluble wax, vol. percent | ca. 25 | 91 | 77 |
| $C_{4-10}$ olefins, vol. percent | ca. 1 | 0 | 18 |

These results show the unexpected effect of decreasing molecular weight with increasing Al/Ti ratio. Decreasing the temperature decreased the average molecular weight and gave high selectivity to low molecular weight olefins.

EXAMPLE 5

A similar run is performed as in Example 3 but a temperature of 60° C. and o-dichlorobenzene are used. Over 95% selectivity to oils is thus obtained. In general the more polar diluents permits employment of higher temperatures without producing solid polymers.

The products of this invention are useful as motor lube base stocks, olefinic synthetic intermediates, hydraulic transmission fluids, pour depressants, synthetic jet engine oils and bright stocks, among others. These products can also be hydrogenated without any diminution in viscosity index.

The advantages of this invention will be apparent to the skilled in the art. Useful oils are prepared in an efficient and economic manner. A process of increased flexibility is provided.

It is to be understood that this invention is not limited to the specific examples which have been offered merely as illustrations and that modifications may be made without departing from the spirit of the invention.

What is claimed is:
1. A method for preparing a pour point depressant which comprises:
 (a) polymerizing an ethylene-containing gas by contacting it with a catalyst comprising a halide of a transition metal selected from titanium, zirconium, or vanadium and an aluminum alkyl compound having the formula $AlR_nX_{3-n}$, $n$ representing a number of at least 1 but less than 2, and X representing a halogen; at a pressure of 0 to 50 p.s.i.g.; in the presence of a halogenated aromatic diluent, and a $C_1$–$C_8$ alkanol such that the ratio of alkanol to the alkyl of the aluminum alkyl after reduction of the metal ha- lide is not greater than 0.5/1.; and
(b) separating from the polymerizate an oil-soluble waxy solid having a boiling point of more than 405° C.

2. The method of claim 1 wherein the diluent is chlorobenzene.

3. The method of claim 1 wherein the metal halide is TiCl$_4$.

4. The method of claim 3 wherein the diluent is chlorobenzene.

5. The method of claim 4 wherein the ratio of alkanol to alkyl is in the range of 0.2/1. to 0.33/1.

6. The method of claim 5 wherein the aluminum alkyl is an ethyl aluminum chloride.

References Cited

UNITED STATES PATENTS 3,168,588   2/1965   White et al. _____ 260—683.15

PAUL M. COUGHLAN, JR., Primary Examiner

U.S. Cl. X.R.

44—80